United States Patent
Howie

(12) 
(10) Patent No.: US 6,171,375 B1
(45) Date of Patent: Jan. 9, 2001

(54) VACUUM CLEANER EXHAUST FILTER WITH ION GENERATION STAGE

(75) Inventor: Mark S. Howie, Bristol, TN (US)

(73) Assignee: Electrolux LLC, Dallas, TX (US)

( * ) Notice: Under 35 U.S.C. 154(b), the term of this patent shall be extended for 0 days.

(21) Appl. No.: 09/277,727

(22) Filed: Mar. 29, 1999

Related U.S. Application Data

(60) Provisional application No. 60/112,543, filed on Dec. 16, 1998.

(51) Int. Cl.[7] .............................. B03C 3/011; B03C 3/30
(52) U.S. Cl. .......................... 96/17; 55/486; 55/DIG. 3; 96/57; 96/63; 96/96; 15/347
(58) Field of Search .................................. 96/17, 57, 58, 96/63, 66, 96; 55/486, DIG. 3, DIG. 39; 15/347, 352

(56) References Cited

U.S. PATENT DOCUMENTS

| | | | |
|---|---|---|---|
| 3,668,842 | * 6/1972 | Batson et al. | 55/DIG. 3 |
| 3,871,847 | * 3/1975 | Fish | 55/DIG. 3 |
| 4,052,983 | 10/1977 | Bovender | 55/485 X |
| 4,115,082 | 9/1978 | Newell | 55/528 X |
| 4,613,348 | * 9/1986 | Natale | 55/DIG. 3 |
| 4,902,306 | 2/1990 | Buirnett et al. | 55/486 X |
| 5,037,455 | 8/1991 | Scheineson et al. | 55/528 X |
| 5,108,470 | * 4/1992 | Pick | 96/58 |
| 5,244,703 | 9/1993 | Bosses | 428/35.2 |
| 5,259,854 | * 11/1993 | Newman | 55/DIG. 3 |
| 5,306,534 | 4/1994 | Bosses | 428/35.2 |
| 5,419,953 | 5/1995 | Chapman | 55/486 X |
| 5,478,377 | 12/1995 | Scavnicky et al. | 96/17 |
| 5,573,577 | * 11/1996 | Joannou | 96/66 |
| 5,593,479 | 1/1997 | Frey et al. | 96/57 |
| 5,647,881 | 7/1997 | Zhang et al. | 55/382 |
| 5,667,562 | 9/1997 | Midkiff | 96/15 |
| 5,807,425 | * 9/1998 | Gibbs | 96/66 |
| 5,840,103 | * 11/1998 | Dyson | 969/63 X |
| 5,846,302 | * 12/1998 | Putro | 96/66 |
| 5,989,320 | * 11/1999 | Rutkowski | 55/DIG. 39 |

OTHER PUBLICATIONS

U.S. Department of Energy, "DOE Standard: Specification for HEPA Filters Used by DOE Contractors," DOE-STD-3020-97, Jan. 1997.

* cited by examiner

Primary Examiner—Richard L. Chiesa
(74) Attorney, Agent, or Firm—Fish & Neave; Jeffrey H. Ingerman

(57) ABSTRACT

A vacuum cleaner exhaust filter assembly includes a main HEPA exhaust filter, and an ion generation stage to add ions to the air. The ion generation stage preferably is a polypropylene mesh which generates ions through static electric interaction with the moving air as the result of friction. The exhaust filter assembly preferably also includes a pre-filter impregnated with carbon, preferably in the form of activated charcoal, to absorb odors from the exhaust air. The filter components, arranged in the preferred order, are the carbon pre-filter, the main HEPA exhaust filter, and the ion generation mesh.

16 Claims, 3 Drawing Sheets

VACUUM CLEANER EXHAUST FILTER WITH ION GENERATION STAGE

CROSS REFERENCE TO RELATED APPLICATION

This claims the benefit of commonly-assigned U.S. Provisional Application No. 60/112,543, filed Dec. 16, 1998.

BACKGROUND OF THE INVENTION

This invention relates to exhaust filters for vacuum cleaners. In particular, this invention relates to a multistage vacuum cleaner exhaust filter in which one of the stages ionizes the exhaust air.

A typical vacuum cleaner, whether of the canister or upright type (with the exception of upright vacuum cleaners of the external bag type), has a body or housing enclosing a compartment for the collection of dirt. An air-flow path is provided through the housing from a suction port to an exhaust port. A motor/fan unit creates a partial vacuum that draws dirt-laden air in through the suction port to the dirt collection chamber. The air then passes through a filter, which typically, but not necessarily, is in the form of a bag made from filter paper, which traps the dirt and allows "clean" air to pass. This "clean" air exits through the exhaust port.

It is well known that the "clean" air exiting a vacuum cleaner exhaust port is not, in fact, clean. Because the filtering properties of the filter bag or other dirt collection filter are selected to allow for a reasonable pressure drop, fine particles of dust and dirt may pass through the filter and out the exhaust port. It is therefore known to provide a further filter on the exhaust port to capture at least some of those fine particles. While the main filter must be cleaned or, in the more common case of a filter bag, emptied or disposed of, relatively often, the exhaust filter typically is cleaned less often.

Although the filter bag is emptied or disposed of relatively frequently compared to the exhaust filter, dirt may remain in the filter bag for a considerable time before it is disposed of. Odors may be generated by bacteria or fungi on the dust particles captured in the filter bag. Moreover, even with an exhaust filter, a certain amount of fine particulates may nevertheless escape into the room air.

Therefore, it would be desirable to be able to provide a vacuum cleaner exhaust filter which is finer than previously known exhaust filters to reduce the amount of fine particulates that escape in the exhaust air, and which reduces odors and even improves room air quality.

SUMMARY OF THE INVENTION

It is an object of this invention to provide a vacuum cleaner exhaust filter which is finer than previously known exhaust filters to reduce the amount of fine particulates that escape in the exhaust air, and which reduces odors and even improves room air quality.

In accordance with the present invention, there is provided a filter assembly for placement in a vacuum cleaner exhaust flow path, the filter assembly including a filter element and an ionization element for ionizing the exhaust flow. The filter element preferably is a high efficiency filter such as a HEPA filter. The filter assembly preferably also includes an odor-absorbing pre-filter such as a pre-filter containing carbon, and particularly containing activated charcoal.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides an exhaust filter assembly, and a vacuum cleaner having such an assembly, that improves room air quality by improving filtration of small particles, by removing odors, and by generating ions (both positive and negative) in the exhaust air flow which are introduced into the ambient room air.

An exhaust filter assembly according to the present invention includes at least a filter element and an ionization element, preferably following the filter element, that ionizes the filtered exhaust air as it leaves the filter assembly. The filter assembly optionally, but preferably, also includes a pre-filter, upstream of the filter element, to assist in removing odors from the exhaust air.

Although any filter element may be used, it is preferred that the filter element be a High-Efficiency Particulate Arresting (HEPA) filter, commonly defined as a filter capable of removing at least 99.97% of particles having a diameter greater than or equal to 0.3 microns. Such filters are commercially available. One particularly preferred filter element is available from LFC, A Filtration Group Company, of Aurora, Ill. Such a filter will capture much of the fine dust that was able to pass through previously known exhaust filters into vacuum cleaner exhaust.

The health benefits of ions in the air, and their air "freshening" ability are well known. Therefore, an ionization element is preferably included in the filter assembly downstream of the filter element, and preferably is passive—i.e., it is not powered by an external supply of electricity—although a powered ion generator can be used as well. Preferably, the ionization element is a plastic mesh which ionizes the air by generating static electricity as a result of friction with the moving air, and which is coarse enough that it does not produce any appreciable back-pressure in the exhaust air stream. More preferably, the plastic mesh is a polypropylene mesh having about 32×30 strands per inch (about 13×12 strands per centimeter), each strand having a diameter of about 0.012 inch (about 0.305 mm), with a total weight of about 5 oz/yd$^2$ (about 170 g/m$^2$).

Finally, to reduce odors in the exhaust air stream, a carbon-containing pre-filter preferably is provided. The pre-filter may be a foam layer impregnated with particles of carbon, preferably in the form of activated charcoal which has a large surface area for absorbing odors, such as that available from Lewcott Corp., of Millbury, Mass., as Part No. ACF-NWPE-4-200-FR. Alternatively, the pre-filter may be a woven or nonwoven mat of carbon-impregnated (preferably activated charcoal-impregnated) fibers. The pre-filter will also capture particles, but is not intended primarily for that purpose, and preferably has a relatively low efficiency in that regard.

Figure 1:
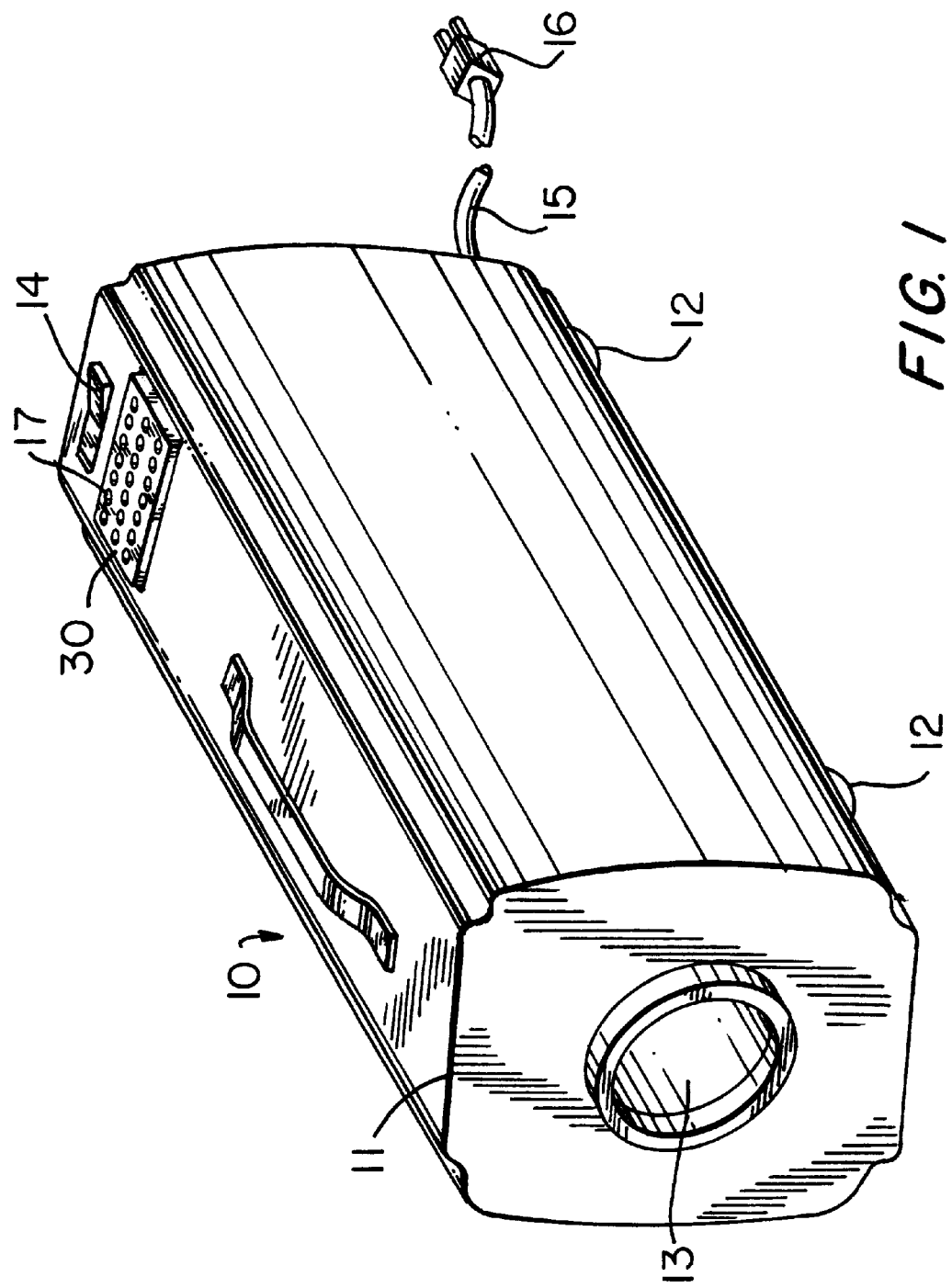
FIG. 1 is a perspective view of a vacuum cleaner incorporating the exhaust filter assembly of the present invention.
Figure 2:
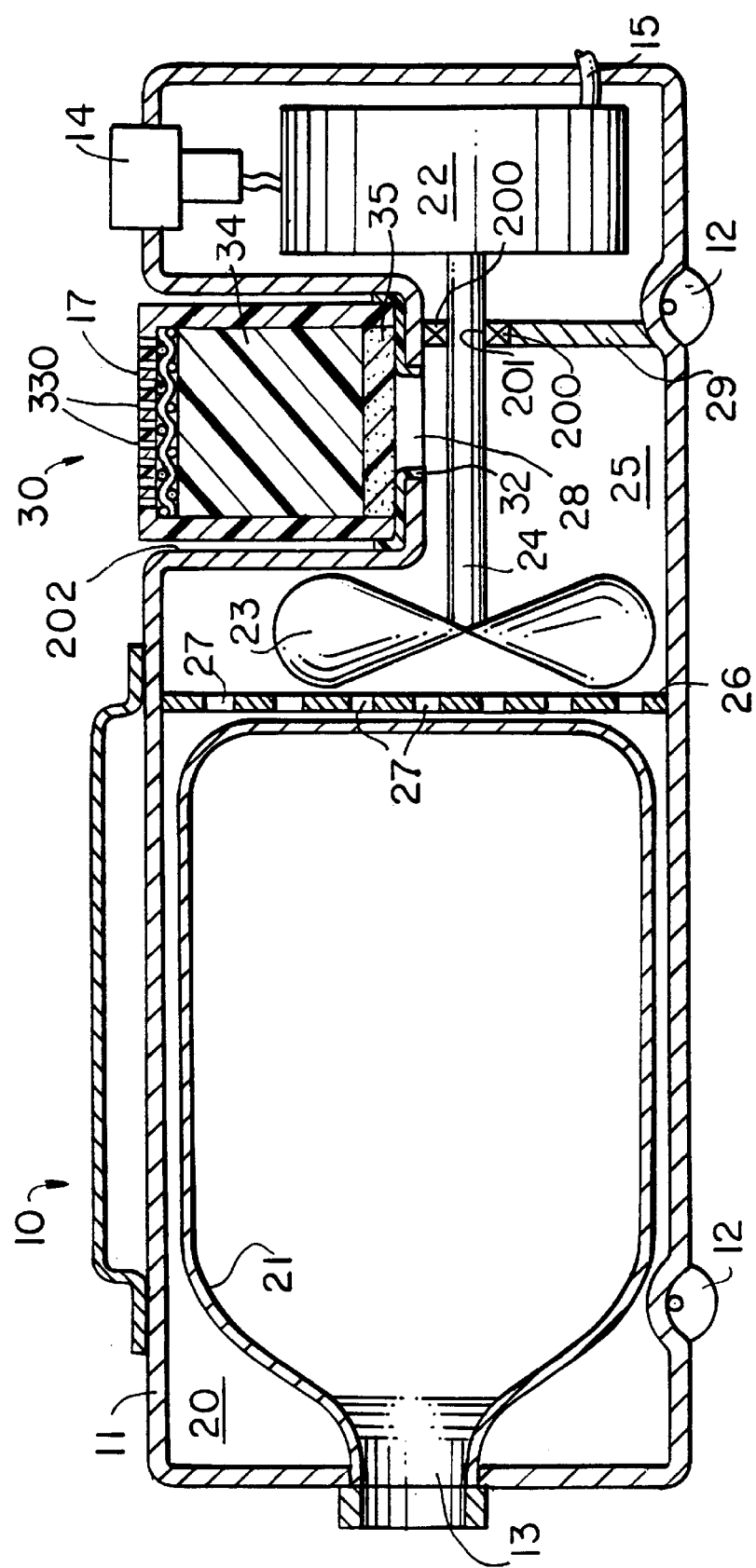
FIG. 2 is a schematic cross-sectional view, taken from line 2—2 of FIG. 1, of the air flow path through the vacuum cleaner and exhaust filter assembly of FIG. 1.
Figure 3:
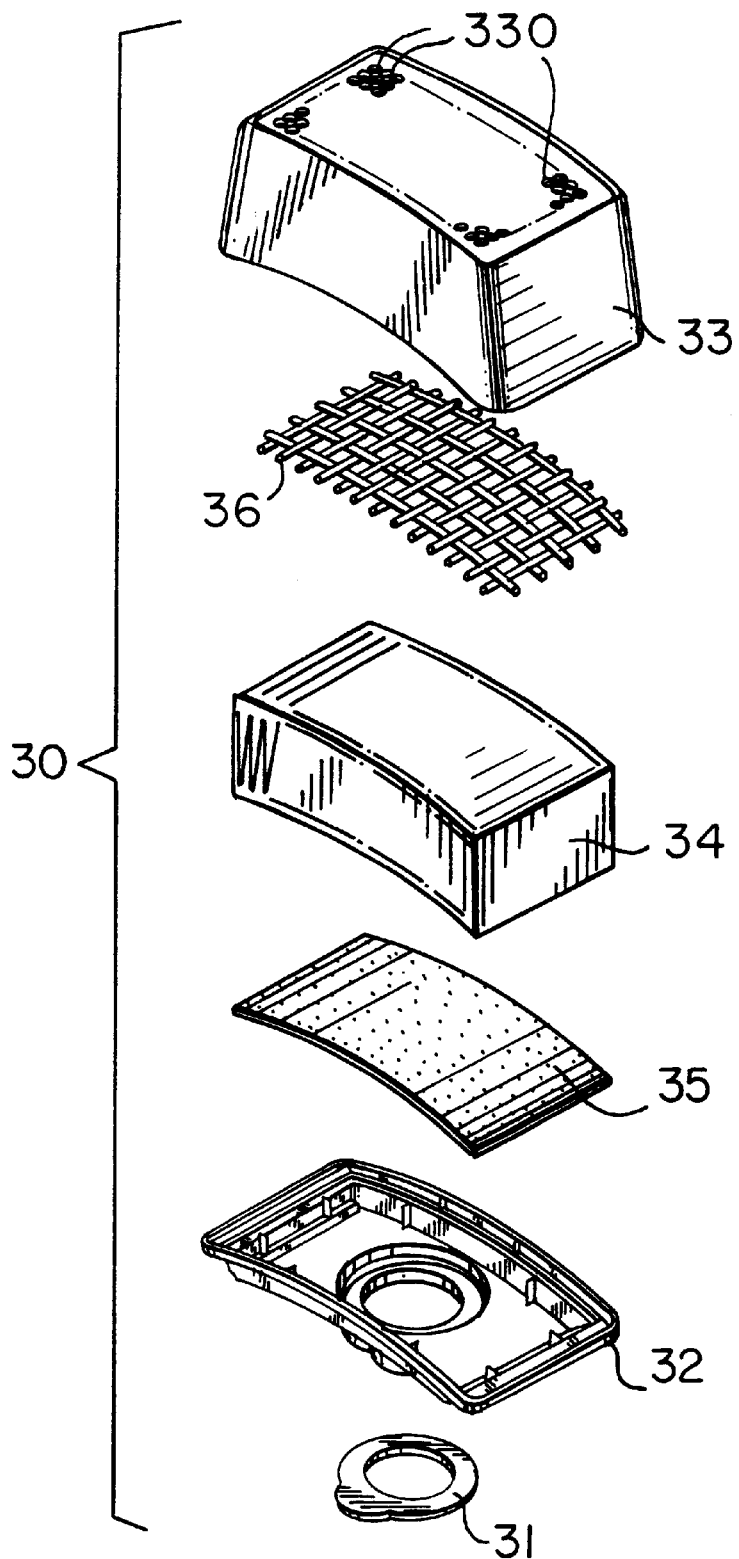
FIG. 3 is an exploded perspective view of the exhaust filter assembly of FIGS. 1 and 2.

The invention will now be described with reference to FIGS. 1–3, which show a preferred embodiment of a filter assembly 30 according to the present invention incorporated in a canister vacuum cleaner 10, although, as set forth above, the invention may also be used in an upright vacuum cleaner. Vacuum cleaner 10 has a body housing 11 which may ride on wheels 12. A suction port or opening 13 preferably leads to a dirt collection chamber 20, which preferably houses a filter bag 21.

A motor 22 preferably turns fan 23 via shaft 24 to create a partial vacuum downstream of filter bag 21 to draw air in through port 13. Preferably, fan 23 is in a compartment 25 separated from chamber 20 by a wall 26 having openings 27 through which fluid communication is possible. Wall 26 prevents the user from coming into direct contact with fan 23, without affecting the flow of air through vacuum cleaner 10.

Dirt-laden air drawn in through port 13 preferably deposits in filter bag 21 any dirt particle having a diameter greater than the pore size of the filter material of filter bag 21. That pore size is chosen to catch most macroscopic dirt particles without causing an excessive pressure drop across filter bag 21. When the filter bag 21 is full, the user disposes of it and the trapped dirt, and replaces it with a new filter bag. As an alternative, a permanent filter (not shown) can be mounted adjacent the upstream side of wall 26, and provided with a pore size similar to that of filter bag 21, so that it traps the same dirt in chamber 20. The user in such a case would have to empty chamber 20 and also clean the permanent filter.

Air that has passed through filter bag 21 (or the permanent filter alternative) preferably then exits vacuum cleaner 10 through exhaust port 28. Motor 22 preferably is separated from the airflow path to exhaust port 28 by wall 29 through which shaft 24 passes. A substantially airtight seal 200 preferably surrounds the opening 201 in wall 29 through which shaft 24 passes. This keeps substantially any fine dust that remains in the air stream out of motor 22. Motor 22 preferably is controlled by switch 14. A power cord 15 preferably is provided, and preferably has a conventional plug 16 for connection to a standard household power outlet. A cord winding mechanism (not shown) may be provided for storage of power cord 15.

In previously known vacuum cleaners, exhaust port 28 would be provided with a conventional exhaust filter such as a sheet of open-cell foam. However, in accordance with the present invention, vacuum cleaner 10 preferably is provided with an exhaust filter assembly 30, which preferably is received in a well 202 in body housing 11.

Exhaust filter assembly 30 preferably includes a seal 31 for sealing against exhaust port 28 to prevent bypass of the exhaust filter assembly 30 by any portion of the exhaust air stream. The components of exhaust filter assembly 30 preferably are enclosed in a housing having a lower housing portion 32 and an upper housing portion 33. Upper housing portion 33 preferably has an array of holes 330 serving as an exhaust "grill" 17 visible on the outside of vacuum cleaner 10.

Within housing 32, 33 of exhaust filter assembly 30 preferably are the three filter components discussed above—main HEPA filter 34, carbon pre-filter 35, and exhaust ionization stage 36. As discussed above, main HEPA filter 34 is preferably a filter element that is available from the Technical Papers Division of Lydall, Inc., of Rochester, N.H., as Lydall Grade 3428, which catches 99.97% of particles having diameters of 0.3 microns or greater. As shown in FIG. 3, filter element 34 preferably is pleated.

As also stated above, pre-filter 35 preferably is a foam layer impregnated with particles of carbon, preferably in the form of activated charcoal which has a large surface area for absorbing odors. Alternatively, the pre-filter may be a woven or nonwoven mat of fibers impregnated with carbon, preferably in the form of activated charcoal.

Finally, again as stated above, ion generation stage 36 preferably is a coarse polypropylene mesh having a mesh size of about 32×30 strands per inch (about 13×12 strands per centimeter). The mesh preferably is woven from polypropylene fibers having a diameter of about 0.012 inch (about 0.305 mm).

In operation, exhaust air, having passed through filter bag 21, preferably exits body housing 11 through exhaust port 28, passing through exhaust filter assembly 30. The exhaust air preferably first passes through carbon pre-filter 35, where any odors preferably are absorbed by carbon, preferably activated charcoal. The exhaust air preferably then passes through main HEPA filter 34 where fine particulates are removed. Finally, the exhaust air preferably then passes through ion generation stage 36, where friction between the exhaust air and polypropylene mesh 36 generates positive and negative ions by static electricity.

The result is that the air exiting from exhaust grill 17 is reduced in both odors and particulates, and carries beneficial ions to ionize and purify the room air.

Thus it is seen that a vacuum cleaner exhaust filter which is finer than previously known exhaust filters to reduce the amount of fine particulates that escape in the exhaust air, and which reduces odors and even improves room air quality, has been provided. One skilled in the art will appreciate that the present invention can be practiced by other than the described embodiments, which are presented for purposes of illustration and not of limitation, and the present invention is limited only by the claims which follow.

What is claimed is:

1. A filter assembly for placement in a vacuum cleaner exhaust flow path, exhaust flow in said exhaust flow path having a flow direction, said filter assembly comprising:
   a pre-filter element;
   a filter element downstream of said pre-filter element along said flow direction;
   a plastic mesh downstream of said filter element along said flow direction for ionizing said exhaust flow, thereby introducing ions into air exiting said exhaust flow path; and
   a housing enclosing said pre-filter element, said filter element and said plastic mesh, said housing comprising a first housing portion, and a second housing portion having an array of holes serving as an exhaust grill.

2. The filter assembly of claim 1 wherein said plastic mesh is a polypropylene mesh.

3. The filter assembly of claim 2 wherein said polypropylene mesh is coarsely woven.

4. The filter assembly of claim 3 wherein said polypropylene mesh has about 32×30 strands per inch (about 13×12 strands per centimeter).

5. The filter assembly of claim 1 wherein said filter element is a HEPA filter.

6. The filter assembly of claim 1 wherein said pre-filter element comprises a carbon filter.

7. The filter assembly of claim 6 wherein said carbon filter comprises an activated charcoal filter.

8. The filter assembly of claim 1 wherein said plastic mesh ionizes said exhaust flow passively.

9. A vacuum cleaner comprising:
   a body, said body having a suction opening therein for the entry of dirt-laden air and an exhaust opening therein for the exit of said dirt-laden air after dirt has been substantially removed therefrom;

an air-flow path between said suction opening and said exhaust opening;

a motor/fan unit for creating air flow in a flow direction in said air-flow path, said air flow drawing said dirt-laden air in through said suction opening;

a dirt collection chamber within said body, said air-flow path passing through said dirt collection chamber;

a primary filter in said dirt collection chamber for removing dirt from said dirt-laden air; and an exhaust filter between said primary filter and said exhaust opening for removing dirt remaining in said dirt-laden air downstream of said primary filter along said air-flow path, said exhaust filter comprising:
 a pre-filter element,
 a filter element downstream of said prefilter element along said air-flow path,
 a plastic mesh downstream of said filter element along said air-flow path for ionizing said air flow, thereby introducing ions into air exiting said air-flow path, and
 a housing enclosing said pre-filter element, said filter element and said plastic mesh.

10. The vacuum cleaner of claim 9 wherein said plastic mesh is a polypropylene mesh.

11. The vacuum cleaner of claim 10 wherein said polypropylene mesh is coarsely woven.

12. The vacuum cleaner of claim 11 wherein said polypropylene mesh has about 32×30 strands per inch (about 13×12 strands per centimeter).

13. The vacuum cleaner of claim 9 wherein said filter element is a HEPA filter.

14. The vacuum cleaner of claim 9 wherein said pre-filter element comprises a carbon filter.

15. The vacuum cleaner of claim 14 wherein said carbon filter comprises an activated charcoal filter.

16. The vacuum cleaner of claim 9 wherein said plastic mesh ionizes said air flow passively.

* * * * *